United States Patent [19]

Forsyth

[11] Patent Number: 5,327,566
[45] Date of Patent: Jul. 5, 1994

[54] STAGE SAVING AND RESTORING HARDWARE MECHANISM

[75] Inventor: Mark A. Forsyth, Fort Collins, Colo.

[73] Assignee: Hewlett Packard Company, Palo Alto, Calif.

[21] Appl. No.: 729,093

[22] Filed: Jul. 12, 1991

[51] Int. Cl.[5] ............................................. G06F 13/24
[52] U.S. Cl. .................................. 395/775; 395/725; 395/425
[58] Field of Search ............... 395/800, 425, 725, 775; 364/200; 307/480

[56] References Cited

U.S. PATENT DOCUMENTS

| | | | |
|---|---|---|---|
| 5,101,497 | 3/1992 | Culley et al. | 395/725 |
| 5,140,197 | 8/1992 | Grider | 307/480 |

OTHER PUBLICATIONS

"CMOS PA-RISC Processor For a New Family of Workstations", by M. Forsyth et al., (IEEE COMPCOM Spring '91 Digest of Papers: Feb. 1991.
"System Design for a Low Cost PA-RISC Desktop Workstation", by R. Horning et al., (IEEE COMPCOM Spring '91) Digest of Papers; Feb. 1991.
"Architecture and Compiler Ehancements for PA-RISC Workstations", by D. Odnert et al., (IEEE COMPCOM Spring '91 Digest of Papers; Feb. 1991.
John F. Wakerly, Digital Design Principles and Practices, 1990, pp. 358, 359, 446, 447.

Primary Examiner—Dale M. Shaw
Assistant Examiner—Gaurav Bhatia

[57] ABSTRACT

A hardware mechanism capable of performing state saving and restoring operations, for use in a computer environment having a computer system having a central processor unit (CPU) with one or more data buses, a set of general purpose registers, instruction decoding logic and a mechanism for detecting interrupt conditions. The present invention generates new SAVE and RESTORE control signals and additional memory elements temporarily store the contents of the general purpose registers during interrupt conditions. The hardware mechanism includes an input section for transferring information from the one or more data buses to general purpose registers for storing the information. An output section is used for transferring the stored information from the general purpose registers to the data bus(es). A set of shadow latches store the contents of the general purpose registers when the CPU issues the SAVE control signal and transfer the contents back to the general purpose registers when the CPU issues the RESTORE control signal.

19 Claims, 2 Drawing Sheets

STAGE SAVING AND RESTORING HARDWARE MECHANISM

DESCRIPTION

1. Technical Field

The present invention is directed to a system and method for saving and restoring the contents of general purpose registers. More particularly, the invention is directed to general purpose registers having "shadow" latches which automatically save and restore the contents of the register during interrupt conditions.

2. Background Art

Modern computers use special hardware to automatically vector instruction execution to an appropriate service subroutine when special conditions are detected. These include such events as I/O devices requesting data, hardware faults, execution of illegal opcodes, arithmetic overflow/underflow, etc. In most cases, these conditions arise infrequently enough that their impact on performance (the speed at which the user programs are executed) is negligible.

In a few cases, a trap or interrupt subroutine is invoked so frequently that it measurably decreases performance. One instance of this is the translation lookaside buffer (TLB) miss trap. A TLB miss trap is invoked every time a virtual-to-physical address mapping pair needed to perform a memory reference by the central processing unit (CPU) is not present in the CPU's on-chip TLB. In this case, normal instruction execution is suspended while a service subroutine looks up the requested translation in a table in main memory and inserts it into the CPU's TLB. The frequency at which this occurs is highly dependent on the instruction and data address reference patterns of the application software being executed.

After completing execution of such a service subroutine, a special instruction called a return from interrupt (RFI) is executed which vectors execution back to the original point in which the interrupt was detected. Execution of the original program or subroutine then proceeds. The fact that the interruption subroutine was executed must not, in any way, alter the outcome of the original code which was being executed before the interrupt condition was detected.

To ensure that this is indeed true, all processor states (register contents, program counter, status bits, etc.) must be returned to their original values before resuming instruction execution in the original code segment. Most of this restoring is accomplished automatically by hardware upon execution of the RFI instruction. One notable exception is the contents of the general purpose (GP) registers. It is generally the responsibility of the interrupt processing subroutines to preserve the contents of any general purpose registers they use for calculations or temporary storage, and set the general purpose registers back to their original contents.

Table 1 below shows a pseudo-code listing for a conventional interrupt processing subroutine. The subroutine is entered via an automatic, hardware generated branch upon detection of the appropriate condition. Instructions within the subroutine then proceed to save the current contents of the general purpose registers they intend to use, process the condition which caused the interrupt, restore the general purpose registers back to their original values, and then return to the original code sequence.

Execution of the necessary instructions to first save the register contents is shown at code segment A. Restoring the contents is shown at code segment B. The time required to save and restore the contents of the registers can often represent a significant percentage of the total time required to process the interrupt. Thus, eliminating code segments A and B would result in an improvement in processing performance as measured in typical time required to complete execution of a given program.

TABLE 1

| Pseudo-code listing of conventional interrupt subroutine. | |
|---|---|
| Interrupt condition detected ↓ | ; hardware generated jump to interrupt routine |
| begin: disable interrupts save register 1 save register 2 A . . . save register n process interrupt restore register 1 restore register 2 B . . . restore register n end: return from interrupt ↓ | ; save the current contents of the registers needed by the interrupt processing subroutine ; restore the n registers used by the interrupt subroutine to original contents ; enable interrupt |

FIG. 1 shows a circuit diagram of a one bit slice memory element 100 (32 of these are required for a 32 bit register) of a standard general purpose register. This register can be set from one of two global input buses (common to all GP registers and other CPU hardware) and dump to one of two global CPU buses, based on control signals SETA and SETB (e.g., set register from "A" bus), DUMPC and DUMPD (e.g., dump register contents to bus "C").

Those working in the field will recognize and envision many equivalent, conventional ways to transfer data from the buses to the memory element and vice versa. Furthermore, those working in the field will be familiar with various types of instruction decoding hardware used to generate control signals which are routed to the appropriate elements of the CPU hardware to complete various tasks.

Four control signals are shown in FIG. 1. SETA and SETB control the transfer of data from the buses A and B to a memory element 102. DUMPC and DUMPD control the transfer of data from the memory element 102 to the output buses labeled C and D, respectively. Data from either input data bus A or B can be stored in the memory element 102.

The control signals SETA and SETB are for switching a pair of input transfer transistors 104 and 106 to transfer data from the buses A and B, respectively, to the memory element 102. The transfer transistor 104 and 106 are depicted as field effect transistors (FETs). The gates of the FETs are connected to the control signals SETA and SETB. The transfer transistors 104 and 106 are rendered conductive to transfer data to the memory element 102 when the corresponding control signal is high.

The memory element 102 is shown as a standard D flipflop with the output taken from the $\overline{Q}$ output, for example. The complement of the information at the input D is transferred to the output $\overline{Q}$ on the next positive going clock pulse on a trigger input CK. The clock input synchronizes operations to times when input bus data is valid.

Two invertors 108 and 110 are used to invert the $\overline{Q}$ output and buffer the data to drive the potentially high resistive/capacitive load of the buses. Two complementary pass circuits 112 and 114 synchronize the driving of the appropriate bus based on the control signals DUMPC and DUMPD, discussed above. Each complementary pass circuit includes a serially connected n- and p-channel FET (116, 118), with their gates controlled by the dump signals. The dump signals are inverted by a pair of invertors 120 at the gates of the p-channel FETs to maximize the voltage swing on the bus.

DISCLOSURE OF THE INVENTION

The present invention is directed to hardware mechanisms used for temporarily storing the contents of one or more general purpose registers during an interrupt condition in a central processor unit (CPU) with at least one data bus, a set of general purpose registers, instruction decoding logic and a mechanism for detecting interrupt conditions.

An input section is used for transferring the information from the one or more data buses to the one or more general purpose registers for storing the information. An output section is used for transferring the stored information from the general purpose register(s) to the data bus(es).

A memory device including a set of shadow latches is used by the hardware mechanism for storing the contents of the general purpose register(s) when control logic in the CPU issues a save control signal in response to determining an interrupt condition. The shadow latches transfer the contents back to be stored in the general purpose register(s) when the control logic of the CPU issues a restore control signal as the result of the decoding of an RFIR (return from interrupt and restore general purpose register contents) instruction.

Each general purpose register may further comprise a plurality of first memory elements each storing one bit of the information and each having an input and an output section. In this further embodiment, the memory device comprises a plurality of second memory elements, each for storing the contents of one of the plurality of first memory elements, when the CPU issues the save control signal and for transferring the contents back to be stored in the corresponding first memory element when the CPU issues the restore control signal.

FEATURES AND ADVANTAGES OF THE PRESENT INVENTION

The "shadowed" general purpose registers of the present invention provide an overall performance improvement over conventional systems which use software to save and restore the contents of general purpose registers during interrupt processing. They also require very low overhead in terms of circuit area, control signals and architectural support in terms of new instruction opcodes.

For instance, this implementation can be contrasted to one which just adds additional general purpose registers reserved for exclusive use by an interrupt processing subroutine. Compared to such a straightforward solution, the shadow register implementation has the following advantages.

Silicon area is an important resource in VLSI (very large scale integration) CPU implementations. A standard register with shadow latches requires approximately two thirds the silicon area of two complete registers. This is because all input and output circuitry required in a standard register does not need to be duplicated in the shadow latches.

The number of control signals required is fewer. Additional general purpose registers would require four additional control signals (two SET signals and two DUMP signals) per additional register, while only two total additional control signals (SAVE and RESTORE) are required to control any number of shadow latches in conjunction with the present invention. Decreasing the number of required control signals further reduces silicon area requirements for logic and signal routing, and reduces overall logical complexity which can reduce design verification and testing requirements.

Finally, fewer new instruction opcodes are required. Only one new instruction (RFIR) is required versus multiple instructions which transfer contents to/from the new general purpose registers from/to other CPU hardware. This reduces the amount of required instruction decoding hardware as well as requirements for support in software development tools such as assemblers, debuggers, and compilers.

BRIEF DESCRIPTION OF THE DRAWINGS

The invention will be better understood if reference is made to the accompanying drawings in which.

BEST MODE FOR CARRYING OUT THE INVENTION

An overall system which incorporates the present invention is generally described in an article by M. Forsyth et al. titled, "CMOS PA-RISC Processor For a New Family of Workstations," *IEEE COMPCOM Spring '91 Digest of Papers*, February 1991. The environment described in this article is only one of many computer systems in which the present invention could be used. The Forsyth article is incorporated herein by reference as if set forth below in full.

The solution of the present invention consists of two parts: a set of "shadow" latches on a subset of the general purpose 32 bit registers, and one new instruction called RFIR (return from interrupt AND restore general purpose register contents).

Figure 2:
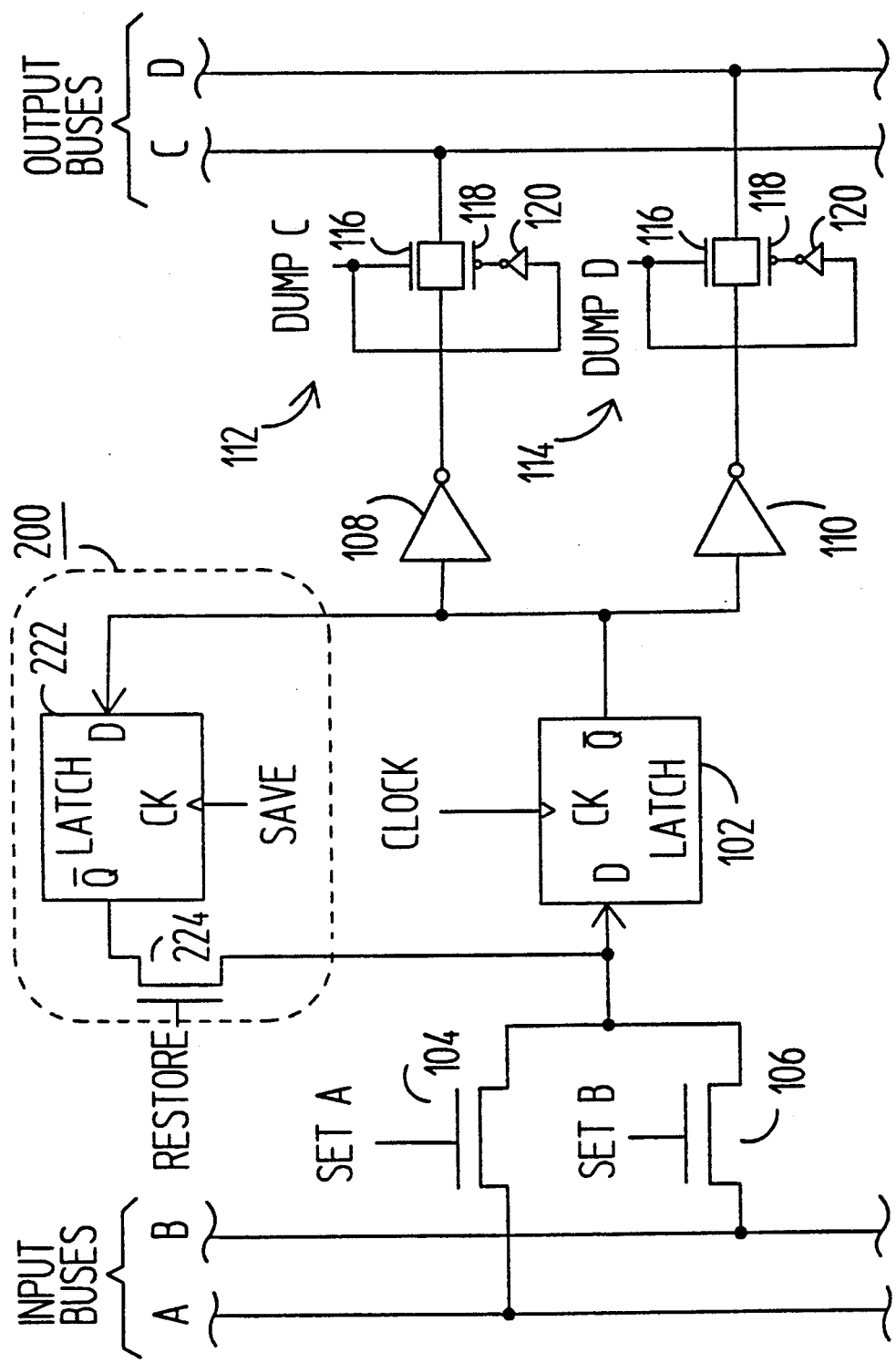
FIG. 2 shows a circuit diagram of one bit slice of a general purpose register including a shadow latch in conjunction with the present invention.

One "shadow" latch is shown at box 200 of FIG. 2. A set of shadow latches is designed to automatically capture a copy of the current contents of the general purpose registers they are implemented on whenever the CPU hardware detects an interrupt condition. Those general purpose registers can then be used for temporary storage by the interrupt subroutine without the need to first save the current contents using software instructions.

The new RFIR instruction is added to the CPU's instruction set to replace the RFI instruction in interrupt subroutines which use the automatic register backup and restore mechanism of the present invention. RFIR performs the same functions as the RFI instruction discussed above, with the addition of restoring the values from the shadow latches back to the general purpose registers.

Table 2 shows a modified pseudo-code listing of an interrupt subroutine made possible with the inclusion of this new feature. It performs the same function as shown in Table 1, but with significantly fewer instructions due to elimination of the need to save (code segment A) and restore (code segment B) the contents of general purpose registers.

TABLE 2

Pseudo-code listing of interrupt subroutine using shadow registers.

| Interrupt condition detected | NEW→ |
|---|---|
| ↓ | ; hardware automatically saves contents of n registers into "shadow" registers |
| begin: disable interrupts process interrupt | ; registers automatically saved are used for temporary storage by interrupt processing subroutine |
| end: return from interrupt AND restore registers ↓ | ; new instruction combines previous operations and automatically restores to the n registers the contents saved in "shadow" registers. |

Figure 1:
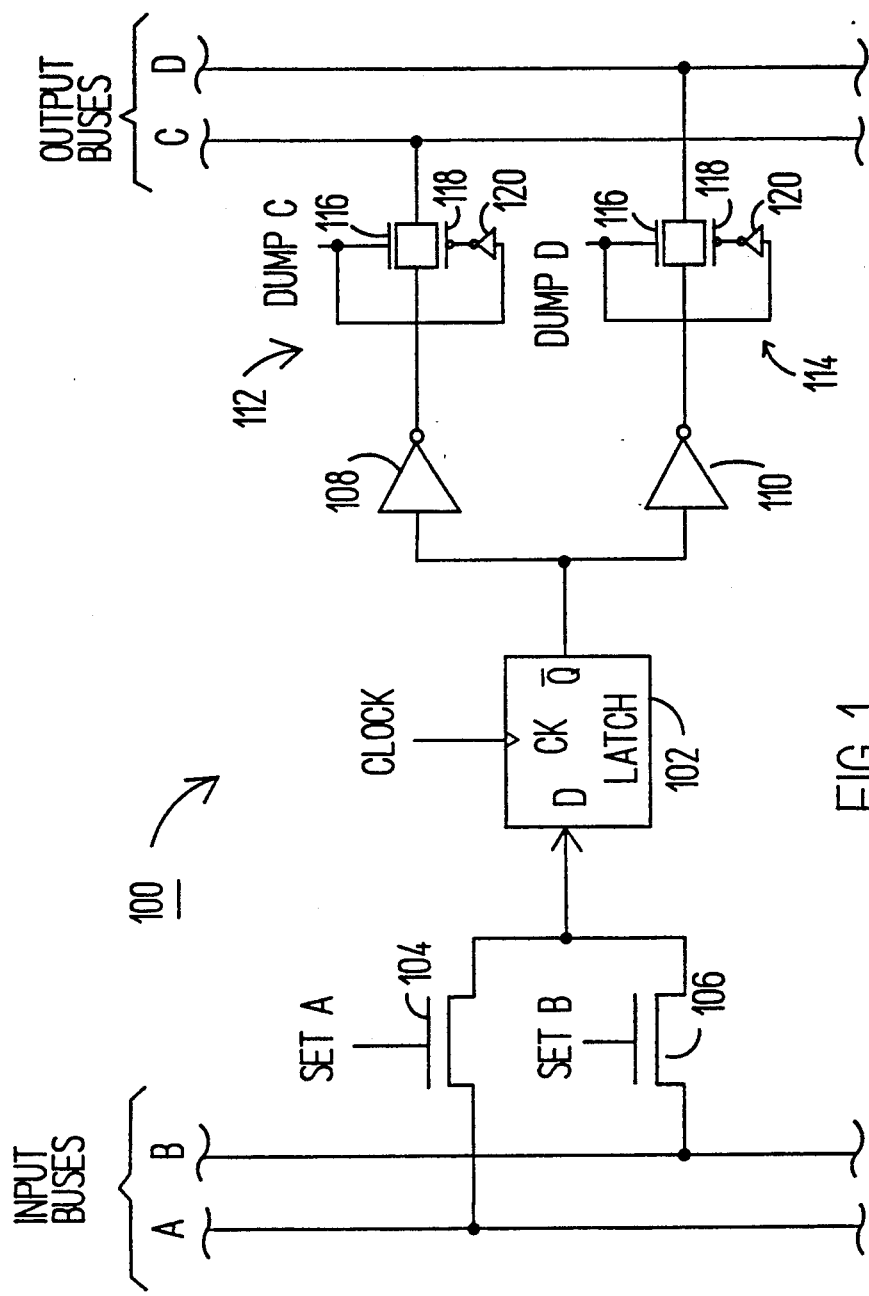
FIG. 1 shows a circuit diagram of one bit slice of a standard general purpose register.

FIG. 2 shows the same register of FIG. 1 with the new modifications which add the shadow latch functionality. A single static latch 222 plus one pass-transistor 224 (a FET or equivalent solid state switching device), are added to the basic register cell. Two new control signals "SAVE" and "RESTORE" control the saving and restoring functions to all latches in parallel.

The shadow latch 222 is a conventional D-type flip-flop or an equivalent. In a preferred embodiment, the shadow latch 222 is located substantially adjacent to the latch 102 on the CPU VLSI chip.

The data input D of the shadow latch 222 is electrically connected (or hardwired) to the $\overline{Q}$ output of the latch 102 for storing the contents of the latch 102 when the CPU save instruction is applied to the trigger input CK of the shadow latch 222. The SAVE signal is generated in a known manner by the CPU control hardware upon detection of an interrupt.

The information at the $\overline{Q}$ output of the latch 102 is stored in the shadow latch 222 when the SAVE signal is logic high, for example. The contents of the latch 102 are thereby saved by the shadow latch 222 until the interrupt processing subroutine is complete. (The latch 102 and the shadow latch 222 are generally referred to as first and second memory elements or flipflops, respectively.)

The FET 224 has gate, source and drain electrodes. The gate electrode is connected to a decoder control line of the CPU corresponding to the RESTORE instruction. The source electrode is connected to the $\overline{Q}$ output of the second memory element (the shadow latch 2), and the drain electrode is connected to the D input of the corresponding first memory element (latch 102).

At the end of the interrupt processing subroutine a RESTORE signal is generated by the instruction decoding hardware upon decoding the opcode for an RFIR instruction. A logic high RESTORE signal, for example, is applied to the gate electrode of the FET 224 to render it conductive. The complement of the information stored in the shadow latch 222, which is the correct information originally stored in the latch 102, is then transferred from the $\overline{Q}$ output of the shadow latch 222 back into the latch 102. Thus, the latch is placed in its pre-interrupt state.

The above discussion of the structure and operation of the one bit shadow latch cell is simply extended to the entire general purpose register, or set of GP registers, by applying the SAVE and RESTORE control signals to the analogous structures.

While various embodiments of the present invention have been described above, it should be understood that they have been presented by way of example, and not limitation. Thus the breadth and scope of the present invention should not be limited by any of the above described exemplary embodiments, but should be defined only in accordance with the following claims and their equivalents. It will be understood by those skilled in the art that various changes in form and detail may be made therein without departing from the spirit and scope of the invention.

Having thus described my invention, what I claim as new and desire to secure by Letters Patent is:

1. An apparatus for performing state saving and restoring operations in a computer system having a central processor unit (CPU) with at least one data bus, at least one general purpose register, instruction decoding logic and a mechanism for detecting interrupt conditions, comprising:
   an input section for transferring information from the at least one data bus to the at least one general purpose register for storing said information;
   an output section for transferring the stored information from the at least one general purpose register to the at least one data bus; and
   a memory device located substantially adjacent, and electrically connected to the at least one general purpose register and between said input section and said output section, for storing the contents of the at least one general purpose register when the CPU issues a SAVE control signal upon detection of an interrupt condition and transferring the contents back to be stored in the at least one general purpose register when the CPU issues a RESTORE control signal upon decoding a return from interrupt and restore (RFIR) instruction.

2. An apparatus according to claim 1, wherein the information is transferred in data words comprising a plurality of bits;
   said at least one general purpose register comprises a plurality of first memory elements each storing one bit of the information and each having an input and an output section; and
   said memory device further comprises a plurality of second memory elements, each for storing the contents of one of said plurality of first memory elements, when the CPU issues the SAVE control signal and for transferring the contents back to be stored in said corresponding first memory element when the CPU issues the RESTORE control signal.

3. An apparatus according to claim 2, wherein each of said input sections comprises a switch connected between an input of the corresponding first memory element and the at least one data bus for performing said transfer of the information therebetween.

4. An apparatus according to claim 3, wherein said switch is a field effect transistor having gate, source and drain electrodes;

said gate electrode being connected to a decoder control line from the CPU's instruction decoding logic;

said source electrode being connected to the at least one data bus; and said drain electrode being connected to said input of the corresponding first memory element.

5. An apparatus according to claim 2, wherein said first and second memory elements are flipflops.

6. An apparatus according to claim 5, wherein said first memory element flipflops are D type latches.

7. An apparatus according to claim 6, wherein each of said second memory element flipflops is a D type latch having a data input, a trigger input and a data output, said data input being connected to said output of said corresponding first memory element flipflop for storing the contents of said corresponding first memory element flipflop when the CPU SAVE control signal is applied to said trigger input.

8. An apparatus according to claim 7, wherein a second switch having a control input connected between said output of said second memory element flipflop and said input of said corresponding first memory element flipflop, the contents of said second memory element flipflop being transferred back to be stored in said corresponding first memory element flipflop when the CPU RESTORE control signal is applied to said control input of said second switch.

9. An apparatus according to claim 8, wherein said second switch is a field effect transistor having gate, source and drain electrodes;

said gate being connected to a further decoder control line of the CPU corresponding to the RESTORE control signal;

said source electrode being connected to said output of said second memory element flipflop; and said drain electrode being connected to said input of said corresponding first memory element flipflop.

10. A general purpose register adapted for use in a CPU, comprising:

a first memory device;

an input section for transferring information from a data bus to said first memory device for storing said information;

an output section for transferring said stored information from said first memory device to said data bus;

a second memory device, connected to said first memory device, for capturing a copy of said information stored in said first memory device whenever the CPU detects an interrupt, said second memory device responsive to a save control signal that indicates when said information stored in said first memory device should be saved in said second memory device and a restore control signal that indicates when said first memory device should be restored with said copy of said information stored in said second memory device, wherein said information stored in said first memory device is saved in said second memory device and restored from said second memory device without accessing said data bus.

11. The general purpose register of claim 10, wherein said restore control signal is responsive to a return from interrupt and restore (RFIR) instruction.

12. The general purpose register of claim 10, wherein the general purpose register comprises a plurality of memory units, wherein each of said memory units includes said first memory device and said second memory device.

13. The general purpose register of claim 12, wherein said information stored in said first memory device is saved to or restored from said second memory device simultaneously in all of said plurality of memory units.

14. The general purpose register of claim 10, wherein said second memory device is located substantially adjacent to said first memory device on a chip which includes the CPU.

15. The general purpose register of claim 10, wherein said first and second memory devices are D flipflops.

16. The general purpose register of claim 10, wherein said second memory device has a data input, a trigger input, and a data output, said data input being connected to said output of said first memory device for storing said information stored in said first memory device when said save control signal is applied to said trigger input.

17. An apparatus according to claim 16, further comprising a switch having a control input connected to said restore control signal, said switch connected between said output of said second memory device and said input of said corresponding first memory device, wherein said copy of said information stored in said second memory device is transferred back to be stored in said corresponding first memory device when said restore control signal is applied to said control input of said switch.

18. The general purpose register of claim 10, wherein said first memory device and said second memory device are connected between said input section and said output section.

19. A method for performing state saving and restoring operations in a computer system having a central processor unit (CPU) with at least one data bus, at least one general purpose register, instruction decoding logic and a mechanism for detecting interrupt conditions, comprising the steps of:

storing, without accessing the at least one data bus, the contents of the at least one general purpose register into at least one corresponding shadow register when the CPU issues a SAVE control signal upon the detection of an interrupt condition, said at least one corresponding shadow register is located substantially adjacent, and electrically connected to the at least one general purpose register;

decoding a return from interrupt and restore (RFIR) instruction;

generating a RESTORE control signal upon the decoding of the RFIR instruction; and transferring, without accessing said at least one data bus, the contents from said at least one corresponding shadow register back to be stored in the at least one general purpose register in response to the RESTORE control signal.

* * * * *